INVENTOR.
LINWOOD E. VIA
BY
James G. Williams
ATTORNEY

United States Patent Office 3,002,745
Patented Oct. 3, 1961

3,002,745
AUTOMOBILE ENGINE LIFT
Linwood E. Via, 1811 E. Main St., Waynesboro, Va.
Filed Aug. 5, 1959, Ser. No. 831,861
9 Claims. (Cl. 269—187)

The invention relates to a lifting device, and particularly to a lifting device adapted to raise an automobile engine and provide access thereto.

In the servicing of present day automobiles, it is frequently necessary for the mechanic to have access to the underside or under portion of the automobile engine. In order that work to the underside of the engine be facilitated or made convenient, it may be necessary that the automobile engine or the front portion of the automobile engine be raised with respect to the frame of the automobile. When the automobile engine is so raised, it is relatively easy to get at or have access to the underside of the engine and perform the necessary or desired work on this portion of the engine, and especially on the oil pan or engine mounting. Heretofore, it has been common practice to raise the automobile engine in the desired manner by means of hydraulic or other types of jacks, particularly floor jacks. However, the disadvantages of such jacks are numerous. For example, it is quite difficult to position such a jack underneath the automobile and raise the engine in the desired manner. Likewise, there is the possibility that such jacks, if portable, may slip and permit the engine to fall. And, where garages must service a large number of makes and models of automobiles, it may be impossible to maneuver or position the jack to the location at which it is needed to raise the engine because of the mechanical construction and configuration of the automobile.

Accordingly, it is an object of my invention to provide an improved and novel lifting device.

Another object of my invention is to provide a novel automobile engine lift which is relatively compact and light in weight, and which can be easily positioned and operated by a mechanic.

Another object of my invention is to provide an improved automobile engine lift that can be safely used by one person, and, at the same time, that can be adapted to fit a large number of makes and models of automobiles.

Another object of my invention is to provide an automobile engine lift which can be fastened or secured to the automobile for use solely from beneath the automobile without the necessity of making difficult or tedious connections.

Briefly, in accordance with my invention, I provide a lifting device having a support adapted to be fastened to a front cross frame and a rear cross frame of the automobile from beneath. The support extends longitudinally of the automobile, and is fastened to the front cross frame by means of a front lock which is pivotally fastened to the front portion of the support and which clamps this front portion to the front cross frame. A rear lock is either rigidly or adjustably fastened to the rear portion of the support and serves to clamp this rear portion of the support to the rear cross frame. A slide is movably mounted on the support between the front and rear portions thereof. This slide carries a lifting screw which is threaded in a suitable opening in the slide. A cradle or some appropriately shaped piece can be fastened to the top of the lifting screw for engaging and supporting a portion of the automobile engine or element to be raised. With the lift just described in position, a single person, by rotating the lifting screw, can easily lift an automobile engine.

It will be apparent to persons skilled in the art that changes may be made in the general arrangement, configuration, and combinations of the structure of my invention without departing from the scope of my invention as defined in the claims. My invention will be better understood from the following description taken in connection with the accompanying drawing, and its scope will be pointed out in the claims. In the drawing:

Figure 1:
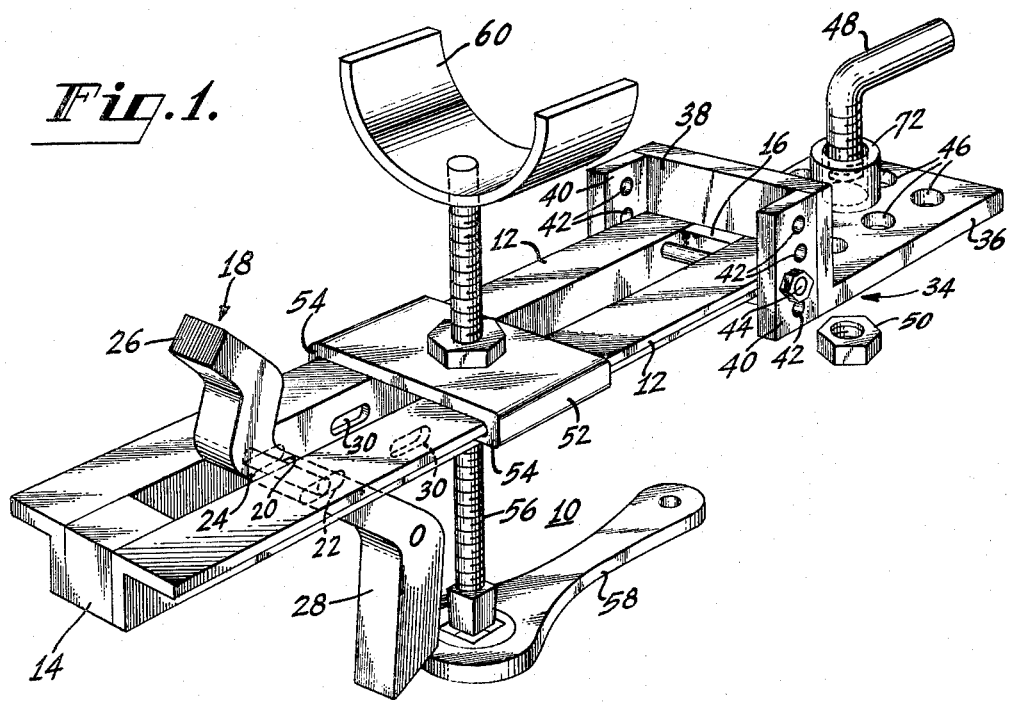
FIGURE 1 shows a perspective view of one embodiment of an engine lift in accordance with my invention.

In the drawing, the same reference numerals are used to refer to the same elements in the different figures. One embodiment of a complete engine lift in accordance with my invention is shown in the perspective view in FIGURE 1. The engine lift 10 comprises a support 12 which may be made up of two angle pieces positioned with two of their respective sides spaced apart and positioned in parallel planes, and with the other two of their respective sides positioned in a common plane as shown. The angle pieces near the front of the support 12 may be held in the desired spaced relationship by a first block 14 positioned between the parallel sides near the front portion of the support 12. The first block 14 is fastened to the parallel sides of the angle pieces by any suitable means such as welding. Similarly, the angle pieces near the rear of the support 12 may be held in the desired spaced relationship by a second block 16 positioned between the parallel sides near the rear portion of the support 12. The second block 16 may also be suitably fastened to the parallel sides of the angle pieces by some means such as welding. While the support 12 may have a different arrangement or configuration than the one just described, the one just described serves my invention more than adequately. A front lock 18 is provided to clamp the front portion of the support 12 to a front cross frame of an automobile. The front lock 18 is pivotally mounted on the support 12 between the parallel sides of the angle pieces by means of a pivot pin 20 which passes through pivot holes 22 in the spaced parallel sides of the angle pieces and through a hole in the pivot portion 24 of the front lock 18. The pivot holes 22 are located at a point slightly to the rear of the first block 14. The front lock 18 includes a clamping portion 26 which may be an integral extension of the pivot portion 24 of the front lock 18, this clamping portion 26 extending in the same general direction as the pivot portion 24 but being offset with respect to the pivot portion 24. The amount of this offset is generally determined by the thickness of a front cross frame to which the front lock 18 is to be fastened. The front lock 18 may also include a handle 28 which enables a mechanic or operator to easily turn or pivot the front lock 18 and clamp the front of the support 12 to a front cross frame of an automobile. The shape of the front lock 18 is clearly shown in FIGURE 2. It will be seen that when the front lock 18 is rotated in a counterclockwise direction about its pivot pin 20, the clamping portion 26 of the front lock 18 is moved downward. This serves to clamp the forward or front portion of the support 12 to a front cross frame in a manner which will be explained. The front lock 18 is held in the clamping position by means of a clamping pin (not shown) which is passed through locking holes 30 in the spaced parallel sides of the angle pieces and through a locking hole 32 in the front lock 18. A rear lock 34 is provided to clamp the rear portion of the support 12 to a rear cross frame of an automobile. The rear lock 34 comprises a horizontal or clamping portion 36 and a vertical or adjusting portion 38. The clamping portion 36 and the adjusting portion 38 are preferably formed from an integral piece and positioned at right angles with respect to each other. However, these portions 36, 38 may be formed of two separate pieces and suitably joined. Vertical tabs 40 are placed at right angles to the ends of the adjusting portion 38, the tabs 40 being provided with a plurality of horizontally aligned sets of adjusting holes 42. A fastening device, such as a bolt 44, is passed through a suitable set of the adjusting holes 42, and through rear lock holes in the spaced parallel sides of the angle pieces of the support 12. The rear lock holes are located at a point slightly to the front of the second block 16. The clamping portion 36 of the rear lock 34 may also be provided with a plurality of clamping holes 46, a selected one of these holes 46 serving to pass a clamping bolt 48 therethrough. The clamping bolt 48 is preferably L-shaped as shown for reasons which will be explained. A suitable clamping nut 50 is provided to screw on the clamping bolt 48 so that the rear portion of the support 12 may be clamped to a rear cross frame. If desired, the clamping nut 50 may be a butterfly type of nut instead of the hexagonally shaped nut shown. A slide 52 is movably mounted on the support 12 between the front and rear locks 18, 34, and is movably held to the support 12 by means of slide tabs 54 which are bent or shaped to pass around the common plane sides of the angle pieces of the support 12. The slide 52 includes a threaded opening (preferably formed in a boss or raised portion to provide additional strength) for receiving a lifting screw 56. The lifting screw 56 is preferably shaped at its lower end to receive a rotating tool, such as a snap-on, ratchet wrench 58 shown in FIGURE 1. The upper portion of the lifting screw 56 may be provided with any one of a plurality of contact elements, such as a cradle 60. The shape of the contact element at the top of the lifting screw 56 is determined by the shape of the piece of the engine which the contact element will engage. And, it is preferable but not necessary that the contact element be of the snap-on type so that other forms of contact elements may be easily placed on the upper end of the lifting screw 56.

Figure 2:
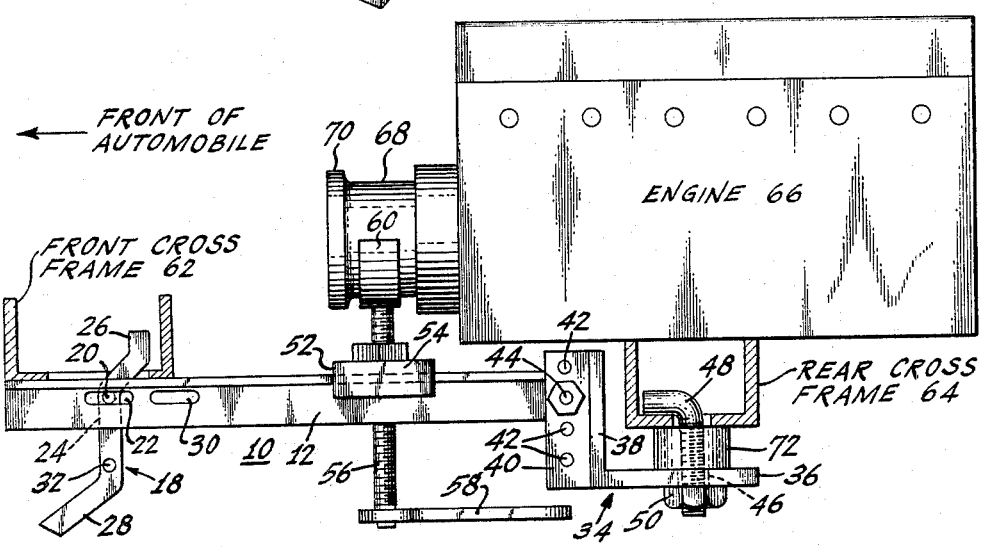
FIGURE 2 shows a side view of the engine lift of FIGURE 1 with relation to the cross frames and engine of an automobile.

A side view of the engine lift 10 described in connection with FIGURE 1, is shown in FIGURE 2. FIGURE 2 also shows portions of an automobile for which the engine lift 10 in accordance with my invention can be used. The engine lift 10 is shown in the position for clamping the lift 10 to portions of the automobile. In FIGURE 2, the forward or front portion of the automobile is indicated by the direction of the arrow. Most present day automobiles include a transverse front cross frame 62 similar to the one shown in cross section in FIGURE 2, and a transverse rear cross frame 64, also similar to the one shown in cross section in FIGURE 2. Usually, such cross frames 62, 64 are of the U-shaped channel configuration shown, such a configuration providing additional strength. Usually, the engine 66 of the automobile is positioned above the cross frames 62, 64 in a manner somewhat similar to the arrangement shown in FIGURE 2. The engine 66 may comprise a pulley shaft 68 to which is fastened a fan belt pulley 70. While the cross frames 62, 64 provide additional strength, they do present a problem when it is desired to attach members thereto in that it is difficult to pass a bolt or other fastening element through the blind type of holes generally provided in the cross frames 62, 64. The problem is made more difficult because portions of the automobile may be directly above and against the cross frames 62, 64. However, this problem is simplified and made relatively easy by the use of my engine lift.

Figure 3:
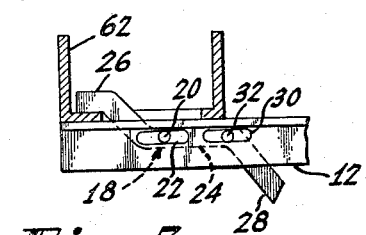
FIGURE 3 shows the manner in which the front lock clamps the support to the front cross frame.

The manner in which my engine lift may 10 may be rigidly fastened to the cross frames 62, 64 of an automobile for raising the engine 66 shown in FIGURE 2 will be explained. The engine lift 10 is shown in FIGURE 2 as it would be positioned for clamping it to the cross frames 62, 64. The L-shaped clamping bolt 48 is positioned on the rear cross frame 64. This is done by passing the shorter portion (or what would be the base of a letter L) of the L-shaped clamping bolt 48 through an opening in and from below the rear cross frame 64 and allowing the longer (or vertical) portion of the L-shaped clamping bolt 48 to hang downward. If the lower surfaces of the front and rear cross frames 62, 64 are at different horizontal levels, this difference may be compensated for by the rear lock 34 being positioned at the proper height with respect to the support 12. This may be done by the selection of a proper set of adjusting holes 42 in the tabs 40 of the adjusting portion 38 of the rear lock 34 or by the use of a suitable sleeve or collar 72. Either arrangement or both arrangements may be used to provide the necessary compensation for any difference which may exist between the horizontal levels of the cross frames 62, 64. The entire engine lift 10 is then held with the front of the support 12 in contact with the lower surface of the front cross frame 62 and with the clamping portion 36 of the rear locking member 34 in contact with the lower surface of the rear cross frame 64. It will be seen in FIGURE 2 that the offset clamping portion 26 of the front lock 18 will pass through the opening of the front cross frame 62, and that the L-shaped bolt 48 will pass through one of the clamping holes 46 in the clamping portion 36 of the rear lock 34. With the engine lift 10 held in this position, the front lock 18 is pivoted (as by the handle 28) in a counterclockwise direction about the pivot pin 20 so that the clamping portion 26 of the front lock 18 moves downwardly and engages the forward upper surface of the front cross frame 62. This position of the front lock 18 is shown in the partial side view of FIGURE 3. When the front lock 18 is in this position, it may be clamped by passing a suitable pin through the locking holes 30 in the support 12 and through the locking hole 32 in the front lock 18. The pivot holes 22 and the locking holes 30 in the support 12 may be elongated as shown so that the front lock 18 may be moved to some extent with relation to the support 12, thus facilitating use of the lift 10. Also with the lift 10 held in the position mentioned, the rear lock 34 is clamped in position by the threading and tightening of the clamping nut 50 on the clamping bolt 48 which passes through an opening 46 in the clamping portion 36 of the rear lock 34. The clamping nut 50 is screwed up against the lower face of the clamping portion 36 of the rear lock 34. If desired, a sleeve or collar may be slipped over the clamping bolt 48 between the clamping nut 50 and the lower face of the clamping portion 36 of the rear lock 34 so as to provide additional strength and rigidity. Thus, it will be seen that the support 12 is securely and firmly held to the front and rear cross frames 62, 64. The slide 52 is then moved forward or backward on the support 12 until the cradle 60 is under a suitable portion of the engine 66. With the slide 52 so positioned, the lifting screw 56 may be rotated, as by the wrench 58, so that the cradle 60 engages a suitable portion of the engine 66 and raises the engine 66. Generally, it has been found that the pulley shaft 68 which connects the internal mechanism of the engine 66 with the fan belt pulley 70 provides a convenient and secure method of lifting the engine 66.

An engine lift in accordance with my invention provides a simple, lightweight, and convenient tool for lifting an automobile engine in order to perform the necessary work on such an engine. My engine lift may be adjusted readily and easily to adapt the lift to a large number of automobile arrangements. For example, the rear lock 34 may be adjusted so that the support 12 may be firmly clamped to front and rear cross frames 62, 64 despite a wide variation in horizontal levels of these cross frames 62, 64. This simple and easy adjustment is attained by the selection of an appropriate set of adjusting holes 42 in the vertical tabs 40 of the rear lock 34. Compensation for differences in horizontal levels of the front and rear cross frames 62, 64 may also be attained by use of an appropriate length sleeve or collar 72. Either or both expedients may be easily and conveniently used in accordance with my invention. Also, the slide 52 enables the lifting screw 56 to be placed most satisfactorily to provide the desired or optimum point at which the engine 66 is lifted. The clamping holes 46 in the clamping portion 36 of the rear lock 34 provide for variations in the distances between the front and rear cross frames 62, 64 as well as for variations in the location of the hole in the rear cross frame 64. And finally, the front lock 18 is quickly clamped to the front cross frame 62 without the difficult task of trying to pass some sort of fastening element downward from above the front cross frame 62, this being a particularly difficult task when the front cross frame 62 has the channel shape shown. Similarly, the L-shaped clamping bolt 48 permits easy attachment of the rear lock 34 to the rear cross frame 64 in that the L-shaped clamping bolt 48 may be passed through the opening in the rear cross frame 64 from beneath the rear cross frame 64 and at the same time provide a safe, secure fastening for the rear lock 34. An automobile engine lift in accordance with my invention is not only lightweight and operable by one person, but is also safe and convenient to use. Furthermore, my engine lift eliminates the need for floor jacks, such jacks being awkward to position beneath an automobile to raise an engine, and awkward to use in safely raising an engine.

What I claim as new and desire to secure by Letters Patent of the United States is:

1. A lifting device comprising a support, a front lock pivotally fastened to one end of said support, said front lock having means operable to prevent pivoting and having a pivot portion and a clamping portion extending from said pivot portion and offset with respect thereto, a rear lock fastened to the other end of said support and including a clamping portion, and lifting means mounted on said support between said ends thereof.

2. A lifting device comprising an elongated support, a front lock having a pivot portion pivotally fastened to one end of said support and having a clamping portion extending from said pivot portion substantially parallel to said pivot portion, said pivot portion of said front lock further having operable means which cooperate with said support to prevent said front lock from pivoting, a rear lock fastened to the other end of said support and including a clamping portion, a slide having an opening therein and being movably mounted on said support between said ends thereof, and lifting means positioned in said opening in said slide.

3. A lifting device comprising an elongated support, a front lock having a pivot portion pivotally fastened to one end of said support and having an offset clamping portion adapted to clamp said one end of said support to an object when said front lock is pivoted in a given direction, operable means to prevent said front lock from pivoting, a rear lock fastened to the other end of said support, said rear lock including a clamping portion having an opening therethrough, threaded means adapted to clamp said clamping portion of said rear lock to an object, a slide movably mounted on said support between said ends thereof, and a lifting element fastened to said slide.

4. A lifting device adapted to be clamped to two objects which are readily accessible from substantially only one direction, comprising an elongated support, a front lock having a pivot portion pivotally fastened to one end of said support and having an offset clamping portion adapted to be passed through an opening in one of said objects from said one direction and thereby clamp said one end of said support to said one object when said front lock is pivoted in a given direction, operable means associated with said lifting device to prevent said front lock from pivoting, a rear lock fastened to the other end of said support, said rear lock including a clamping portion having an opening therethrough, means adapted to be passed through an opening in the other of said objects and through said opening of said clamping portion of said rear lock from said one direction and thereby clamp said rear lock to said other object, a slide movably mounted on said support between said ends thereof, and a lifting screw threaded into a hole in said slide.

5. An automobile engine lift adapted to be clamped to two transverse cross frames of an automobile, said cross frames being readily accessible from substantially only one direction, comprising a support having a pair of members arranged with respective sides of said members positioned substantially parallel to each other, a front lock positioned between said sides of said members at one end thereof, said front lock having a pivot portion pivotally fastened to said sides of said members and having an offset clamping portion extending from said pivot portion of said front lock, said offset clamping portion of said front lock being adapted to pass through an opening in one of said cross frames and clamp said one end of said support to said one cross frame when said front lock is pivoted in a given direction, operable means for preventing said front lock from pivoting after said front lock is pivoted in said given direction, a rear lock having an upright adjusting portion and a horizontal clamping portion, said upright portion of said rear lock being adjustably fastened to said members at the other end thereof, bolting means for fastening said rear lock to the other of said cross frames, a slide movably mounted on said members, said slide having a threaded opening therethrough, and a lifting screw threaded into said opening in said slide, said lifting screw having means attached to one end thereof for engaging a portion of said engine to be lifted.

6. An automobile engine lift adapted to be clamped to two transverse cross frames of an automobile, said cross frames being readily accessible substantially only from beneath, comprising a support having a pair of angle members positioned with one side of one of said angle members adjacent to and substantially parallel to one side of the other of said angle members and with the other sides of both of said angle members positioned substantially in a common plane, a front lock positioned between said one sides of said angle members at one end thereof, said front lock having a pivot portion pivotally fastened to said one sides of said angle members and having an offset clamping portion extending from said pivot portion of said front lock, said front lock having selectable means for preventing said front lock from pivoting, said offset clamping portion of said front lock being adapted to pass through an opening in one of said cross frames from beneath and clamp said one end of said support to said one cross frame when said front lock is pivoted in a given direction, a rear lock having an upright adjusting portion and a horizontal clamping portion, said upright portion of said rear lock being fastened to said angle members at the other end thereof, said horizontal portion of said rear lock having a plurality of openings therethrough, an L-shaped bolt, said L-shaped bolt being adapted to pass through an opening in the other of said cross frames from beneath and fasten said rear lock to said other cross frame, a slide movably mounted on said angle members of said support, said slide having a threaded opening therethrough, and a lifting screw threaded into said opening in said slide, said lifting screw having means attached to one end thereof for engaging a portion of said engine to be lifted.

7. A device for lifting at least a portion of an engine mounted in an automobile having two transverse cross frames, comprising an elongated support, a front lock, said front lock including a pivot portion movably fastened to one end of said support and including a clamping portion, said clamping portion being offset with respect to said front lock and being adapted to pass through a hole in one of said cross frames and clamp said one end of said support to said one cross frame, means for locking said front lock after said front lock clamps said support to said one cross frame, a rear lock, said rear lock being fastened to the other end of said support, means adapted to be passed through a hole in the other one of said cross frames and adapted to be fastened to said rear lock and clamp said other end of said support to said other cross frame, a slide movably mounted on said support between said ends thereof, and a lifting screw positioned in an opening in said slide whereby said engine may be raised by turning said lifting screw.

8. A device for lifting a portion of an engine mounted in an automobile having two transverse cross frames, comprising an elongated support adapted to be positioned longitudinally of said automobile between said cross frames, a front lock, said front lock including a pivot portion movably fastened to one end of said support, including means to prevent said front lock from pivoting, and including a clamping portion, said clamping portion being offset with respect to said pivot portion and being adapted to pass upwardly through a hole in one of said cross frames and to clamp said one end of said support to said one of said cross frames when said front lock is pivoted, a rear lock, said rear lock being fastened to the other end of said support and including an opening therein, means including a bolt adapted to be passed upwardly through said opening of said rear lock and through a hole in the other of said cross frames to clamp said other end of said support to said other cross frame, a slide having a threaded opening therein movably mounted on said support between said ends thereof, and a lifting screw threaded into said threaded opening of said slide and adapted to raise said engine when said lifting screw is rotated.

9. A device for lifting a portion of an engine mounted in an automobile having two transverse cross frames, comprising an elongated support adapted to be positioned longitudinally with respect to said automobile between said cross frames, a front lock, said front lock including a pivot portion pivotally fastened to one end of said support, including locking means, and including a clamping portion, said locking means being operable to prevent said front lock from pivoting, said clamping portion being adapted to pass upwardly through a hole in one of said cross frames so as to clamp said one end of said support to said one cross frame when said front lock is pivoted so that said clamping portion of said front lock clamps downwardly on an upper surface of said one cross frame, a rear lock fastened to the other end of said support, said rear lock including an adjusting portion so that the relative height of said rear lock and said support may be adjusted and including a clamping portion having a plurality of openings therein and extending rearwardly from said adjusting portion, means including an L-shaped bolt adapted to be passed upwardly through one of said openings in said clamping portion of said rear lock and through a hole in the other of said cross frames so that the base of said L-shaped bolt rests against an upper surface of said other cross frame with a threaded portion extending downwardly therefrom, a nut adapted to be threaded on said L-shaped bolt to clamp said other end of said support to said other cross frame, a slide having a threaded opening therein movably mounted on said support between said ends thereof, and a lifting screw threaded into said threaded opening of said slide whereby said engine may be raised by rotating said lifting screw.

References Cited in the file of this patent

UNITED STATES PATENTS

| | | |
|---|---|---|
| 1,600,835 | Manley | Sept. 21, 1926 |
| 2,046,657 | Schultz | July 7, 1936 |
| 2,050,130 | Schupbach | Aug. 4, 1936 |
| 2,825,128 | Manning | Mar. 4, 1958 |
| 2,843,360 | Proctor | July 15, 1958 |
| 2,865,585 | Beyer et al. | Dec. 23, 1958 |